United States Patent
Huang et al.

(10) Patent No.: US 7,850,139 B2
(45) Date of Patent: Dec. 14, 2010

(54) TRANSPORTATION FRAME FOR OVERSIZE CONTAINER AND METHOD OF INSTALLING THE FRAME ONTO THE CONTAINER

(75) Inventors: Tzan Hua Huang, Qingdao (CN); Guohao Huang, Qingdao (CN); Zhiqing Li, Qingdao (CN); Ryan Xu, Qingdao (CN); Niancheng Zhou, Qingdao (CN); Chaofu Xie, Qingdao (CN); Songlin Xu, Qingdao (CN)

(73) Assignees: China International Marine Containers (Group) Ltd., Guandong (CN); Qingdao CIMC Special Reefer Co., Ltd., Qingdao (CN)

( * ) Notice: Subject to any disclaimer, the term of this patent is extended or adjusted under 35 U.S.C. 154(b) by 750 days.

(21) Appl. No.: 11/834,277

(22) Filed: Aug. 6, 2007

(65) Prior Publication Data
US 2009/0039092 A1    Feb. 12, 2009

(51) Int. Cl.
*A47B 97/00*    (2006.01)
(52) U.S. Cl. .................... 248/500; 220/23.91; 220/694; 248/544
(58) Field of Classification Search .............. 248/500, 248/505, 544, 541; 220/1.5, 23.91, 694; 206/3, 335, 448, 449; 410/77
See application file for complete search history.

(56) References Cited

U.S. PATENT DOCUMENTS

| | | | | | |
|---|---|---|---|---|---|
| 1,181,377 | A | * | 5/1916 | Dowell | ........................ 410/97 |
| 3,616,959 | A | * | 11/1971 | Remesy et al. | .............. 220/647 |
| 6,098,944 | A | * | 8/2000 | Pangborn et al. | ............ 248/317 |
| 6,102,356 | A | * | 8/2000 | Huntley et al. | .............. 248/500 |
| 2007/0295724 | A1 | * | 12/2007 | Tianhua et al. | ........... 220/23.91 |
| 2009/0166235 | A1 | * | 7/2009 | Mansson et al. | ............ 206/391 |

* cited by examiner

*Primary Examiner*—Ramon O Ramirez
(74) *Attorney, Agent, or Firm*—The Webb Law Firm

(57) ABSTRACT

The present invention provides a transportation frame for an oversize container or the like and a method of installing the frame onto the container or the like. The transportation frame includes a top frame body comprising two top corner fittings each provided with a top corner fitting hole, a bottom frame body comprising two bottom corner fittings each provided with a bottom corner fitting hole, and a plurality of posts each having two ends connected to the top frame body and the bottom frame body respectively. The orientations of the two top corner fitting holes and the distance therebetween, and the orientations of the two bottom corner fitting holes and the distance therebetween satisfy the requirements for coupling with corner fittings of neighboring stacked containers. With the invention, non-standard containers may be easily hoisted, stacked and transported. Moreover, the transportation frame can be easily operated and stored while being reusable.

13 Claims, 6 Drawing Sheets

TRANSPORTATION FRAME FOR OVERSIZE CONTAINER AND METHOD OF INSTALLING THE FRAME ONTO THE CONTAINER

FIELD OF THE INVENTION

The present invention relates to a transportation frame for an oversize container or the like, as well as a method of installing the frame onto the container or the like.

BACKGROUND OF THE INVENTION

A standard container is usually equipped with corner fittings at eight corners thereof to facilitate lifting and stacking operations of the container. Generally twist locks are employed to connect the corner fittings of the neighboring stacked containers together to ensure a safe stacking of containers. Whether containers are stacked in a suitable way is significant for the transport efficiency of a container ship. The external sizes of ISO containers and the positioning dimensions of corner fittings thereof are designed to comply with ISO 668, and therefore ISO containers can make better use of the shipping space of the containership especially designed according to the ISO container sizes.

For non-standard containers with special external sizes or special corner fittings location, there arises a problem that these containers can't make better use of the shipping space of the containership or even are difficult to transport by the containership. To solve the above mentioned problem, bulk ships are used to transport the containers with the special external sizes in bulk. In such a way, technical improvements are needed in a transport ship for transporting the containers with the special external sizes, thereby resulting in an improvement cost and increasing the transportation cost.

Therefore, a new equipment is desired to solve the above-mentioned problem and to reduce the transportation risk.

SUMMARY OF THE INVENTION

An object of the present invention is to provide a transportation frame for an oversize container by which the oversize container may be transported efficiently with the general containership.

Another object of the present invention is to provide a method of installing the above-mentioned transportation frame onto the oversize container by which the oversize container can be effectively transported.

According to a first aspect of the present invention, there is provided a transportation frame for an oversize container, including: a top frame body comprising two top corner fittings positioned at its both sides respectively, each of the top corner fittings having a top corner fitting hole for cooperating with a container-crane or a twist lock of a neighboring stacked container, upper surfaces of the two top corner fittings being in an identical horizontal plane and slightly higher than or being as high as an uppermost surface of the top frame body, exclusive of the top corner fittings; a bottom frame body comprising two bottom corner fittings positioned at its both sides respectively, each of the bottom corner fittings having a bottom corner fitting hole for cooperating with a twist lock of a neighboring stacked container, low surfaces of the two bottom corner fittings being in an identical horizontal plane and slightly lower than or being as low as a lowermost surface of the bottom frame body, exclusive of the bottom corner fittings; and a plurality of posts each having two ends respectively connected to the top frame body and the bottom frame body, wherein orientations of two top corner fitting holes in the two top corner fittings and a distance between the two top corner fitting holes, as well as orientations of two bottom corner fitting holes in the two bottom corner fittings and a distance between the two bottom corner fitting holes satisfy requirements for coupling with corner fittings of neighboring stacked containers, and orthographic projections of the two top corner fitting holes onto a horizontal plane coincide with those of the two bottom corner fitting holes onto the horizontal plane.

In an embodiment of the present invention, the transportation frame further includes a tightening mechanism provided at an upper inner side of at least one of the posts, for preventing an upper portion of the container from being laterally displaced.

In an embodiment of the present invention, the transportation frame further includes a container-connecting member at the bottom frame body or the posts for connecting with the container.

In an embodiment of the present invention, the posts are fixedly connected with the top frame body and the bottom frame body.

In an embodiment of the present invention, the posts are detachably connected with the top frame body and the bottom frame body.

In an embodiment of the present invention, the top frame body includes: a pair of lateral beams which are in parallel with each other and aligned with each other, a pair of top corner fitting supporters respectively located near both ends of the pair of lateral beams and connected to them, two top corner fittings respectively fixed to middle portions of the top corner fitting supporters, and connecting plates respectively provided at undersides of end portions of the lateral beams of the top frame body and formed with holes for connection; the bottom frame body includes: a pair of lateral beams which are in parallel with each other and aligned with each other, a pair of bottom corner fitting supporters respectively located near both ends of the pair of lateral beams and connected to them, two bottom corner fittings respectively fixed to middle portions of the bottom corner fitting supporters, and connecting plates respectively provided at upsides of end portions of the lateral beams of the bottom frame body and formed with holes for connection; the plurality of posts includes four posts, and each post is provided at its upper and lower ends with a connecting plate respectively for connecting with the connecting plate of the top frame body and the connecting plate of the bottom frame body, and each connecting plate of the post is formed with holes corresponding to the holes in the connecting plate of the top frame body or in the connecting plate of the bottom frame body; and the top frame body, the posts and the bottom frame body are fastened together by use of fasteners inserted through the holes in the corresponding connecting plates to thus form an integrated structure.

In an embodiment of the present invention, the container-connecting member is an elongated piece with an "L"-shaped profile, and includes a wall to be connected with the oversize container in which a plurality of holes are formed so as to allow connection of the container-connecting member to the container by fasteners inserted through the corresponding holes.

In an embodiment of the present invention, the transportation frame further includes a reinforcing mechanism with a side connected to the lateral beam of the bottom frame body and the other side connected to the container to be transported.

In an embodiment of the present invention, the reinforcing mechanism includes: a bar, a first connecting plate and a second connecting plate, and wherein both ends of the bar are respectively connected to the first connecting plate and the second connecting plate, and the first and second connecting plates are further respectively connected to the container to be transported and the lateral beam of the bottom frame body.

In an embodiment of the present invention, the first connecting plate and the second connecting plate are connected with the container and the transportation frame by threaded fasteners, and the bar is designed as a length adjustable structure comprising: two sleeves connected to the first connecting plate and the second connecting plate respectively and formed with internal threads of contrary styles, and a threaded rod which is connected to the two sleeves and has external threads formed at its two end portions respectively, the external threads at the two end portions of the threaded rod being contrary in their styles so that both ends of the threaded rod simultaneously enters into or retracts from the two sleeves when rotating the threaded rod.

In an embodiment of the present invention, the reinforcing mechanism includes: a front connecting plate; two bars each having a first end connected to the front connecting plate; two rear connecting plates respectively connected to second ends of the two bars and also both connected to the lateral beam of the bottom frame body with a predetermined distance spaced from each other; a first generally semi-ring shaped member fixed to the front connecting plate; a second generally semi-ring shaped member to be cooperated with the first generally semi-ring shaped member; and fasteners for connecting the first and second generally semi-ring shaped members together, wherein inner surfaces of the first generally semi-ring shaped member and the second generally semi-ring shaped member are adapted to clamp a pin member projecting from a bottom of the container to be transported, the two rear connecting plates are formed with holes for connecting with the lateral beam of the bottom frame body, and each of the two bars includes: two sleeves connected to the front and rear connecting plates respectively and both formed with internal threads of contrary styles, and a threaded rod connected to the two sleeves with corresponding external threads formed at its two end portions respectively.

In an embodiment of the present invention, the tightening mechanism includes: a plate member fixed to the upper inner side of the post and formed with a threaded through hole, a tightening bolt capable of engaging with the threaded through hole of the plate member, and a pressing block arranged at a front end of the tightening bolt, wherein a front end of the pressing block is contacted with the container, and a rear end of the pressing block is formed with a blind hole in which the front end of the tightening bolt is inserted with a radial clearance.

In an embodiment of the present invention, the tightening mechanism is further cooperated with two stopping blocks which are fixedly connected to the container and clamp the pressing block therebetween for preventing a displacement of the transportation frame with respect to the container to be transported in the longitudinal direction of the container.

According to a second aspect of the present invention, there is provided a method of installing the above-mentioned transportation frame for an oversize container onto the oversize container, wherein the method includes a step of installing two said transportation frames onto a front portion and a rear portion of the container to be transported and ensuring the distance between the two top corner fitting holes of the two transportation frames in the longitudinal direction of the container and the distance between the two bottom corner fitting holes of the two frames in the longitudinal direction of the container respectively to satisfy the requirements for connecting with the bottom corner fittings and top corner fittings of neighboring stacked containers.

In an embodiment of the present invention, the transportation frame further includes a tightening mechanism provided at an upper inner side of at least one of the posts for preventing an upper portion of the container from being laterally displaced, two stopping blocks which are fixedly connected to the container and clamp each pressing block therebetween for preventing a displacement of the transportation frame with respect to the container to be transported in the longitudinal direction of the container, and a container-connecting member at the bottom frame body or the posts for connecting with the container, and the method further includes a step of connecting the container-connecting member with the container to be transported together, operating the tightening mechanism to press against the container to be transported, and welding the stopping blocks to the container to clamp each pressing block therebetween.

In an embodiment of the present invention, the posts, the top frame body and the bottom frame body are detachably connected with each other, and the step of installing two said transportation frames onto a front portion and a rear portion of the container to be transported further includes sub-steps of: disposing two bottom frame bodies in an identical level so that the distance between the two bottom corner fitting holes of the two bottom frame bodies in the longitudinal direction of the container satisfies the requirements for connecting with the top corner fittings of a neighboring stacked container; connecting the posts with the bottom frame bodies together; and connecting two top frame bodies with the posts and ensuring that the distance between the top corner fitting holes of the two top frame bodies in the longitudinal direction of the container satisfies the requirements for connecting with the bottom corner fittings of a neighboring stacked container.

In an embodiment of the present invention, the method further includes a step of connecting a reinforcing mechanism between each of the bottom frame bodies and the container.

With the transportation frame as well as the method of installing the transportation frame onto the container according to the present invention, the oversize container may be easily hoisted, stacked and transported. Moreover, the transportation frame according to the present invention is advantageous in that it can be easily operated and stored while being reusable.

BRIEF DESCRIPTION OF THE DRAWING

The present invention will be described in detail hereinafter with reference to the accompanying drawings as well as preferred embodiments of the present invention. In the drawings.

DETAILED DESCRIPTION OF THE INVENTION

Figure 1:
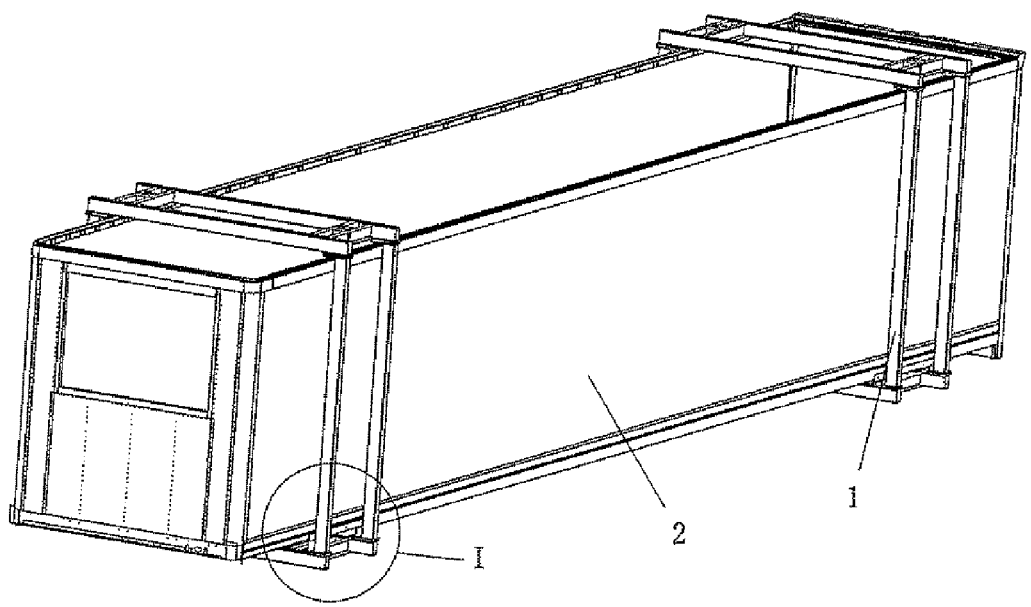
FIG. 1 is a schematic perspective view illustrating a state where two transportation frames according to the present invention are installed onto a container.
Figure 2:
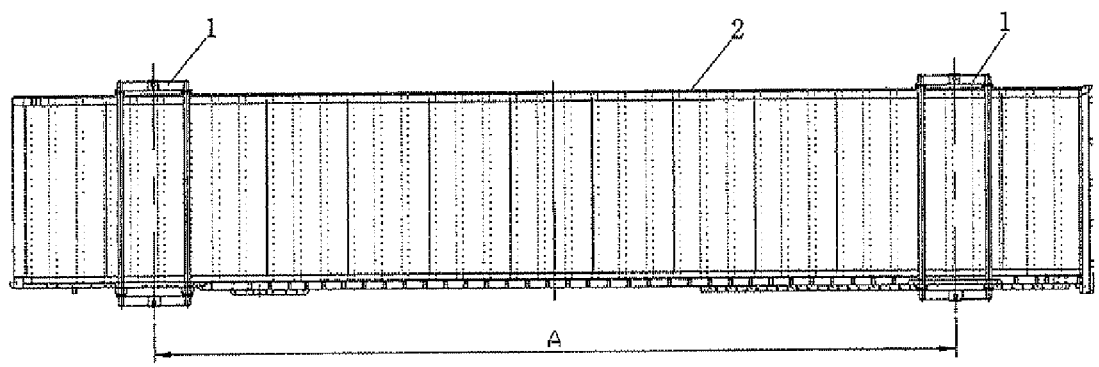
FIG. 2 is a front view of FIG. 1.
Figure 3:
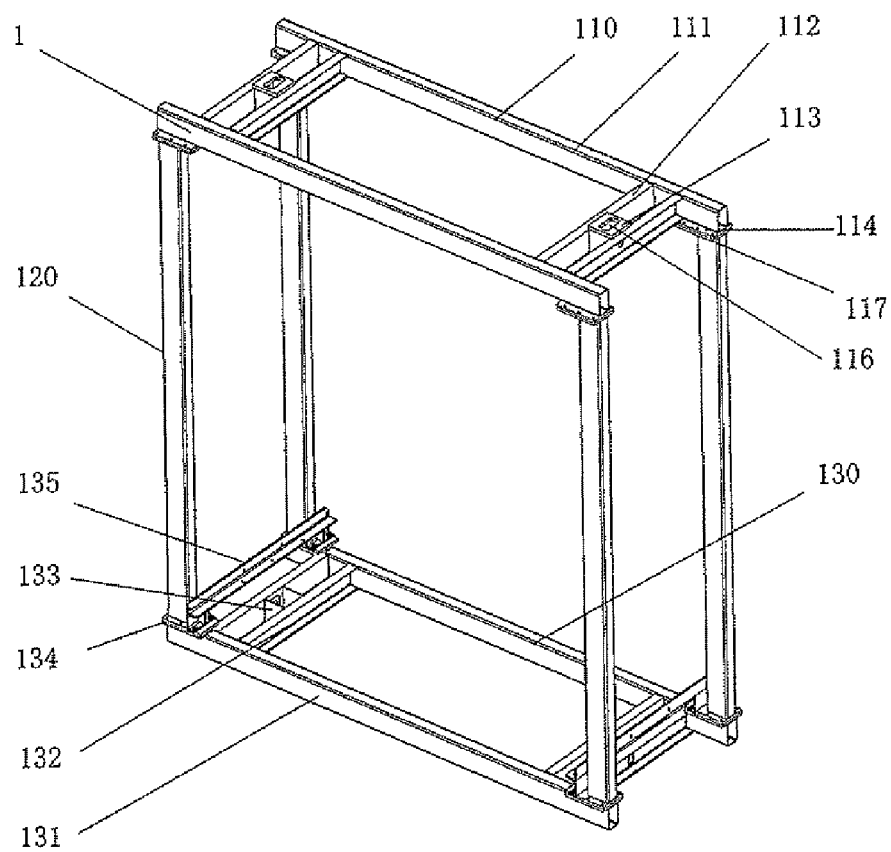
FIG. 3 is a schematic perspective view showing an embodiment of the transportation frame for the oversize container according to the present invention.

FIGS. 1 and 2 respectively show a schematic perspective view and a front view of a state where two transportation frames for an oversize container according to the present invention are installed onto a container. An embodiment of the transportation frame 1 for an oversize container according to the present invention is shown in FIGS. 3 to 6. As shown in FIG. 3, the transportation frame 1 for an oversize container includes a top frame body 110, a bottom frame body 130 and four vertical posts 120. Both ends of each post 120 are respectively connected to the top frame body 110 and the bottom frame body 130 so that a generally rectangular parallelepiped space adapted for accommodating and fixing a portion of the container 2 to be transported is formed among the four posts 120, the top frame body 110 and the bottom frame body 130 (see FIGS. 1 and 2).

Figure 5:
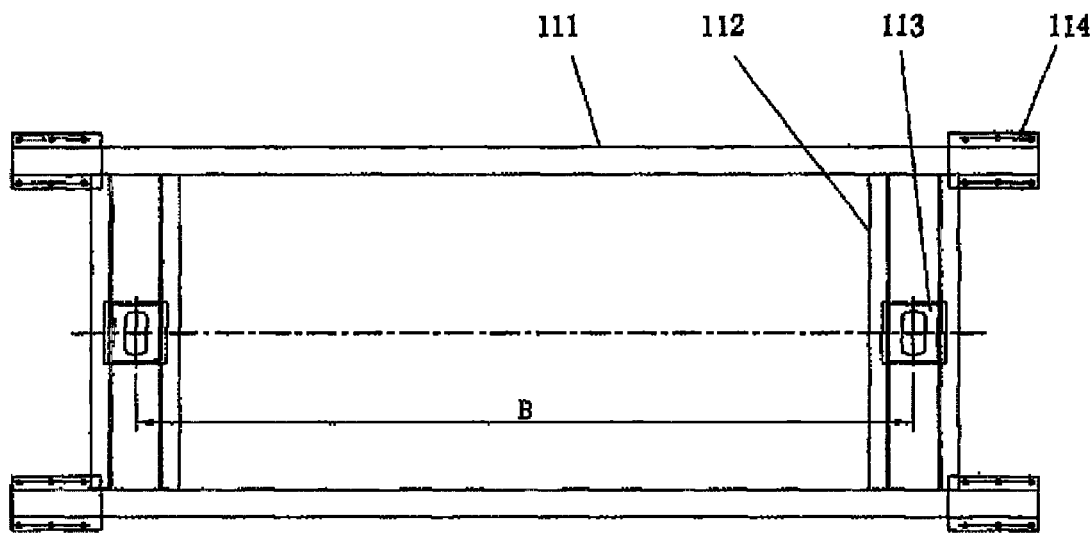
FIG. 5 is a front view showing an embodiment of a top frame body of the transportation frame for the oversize container according to the present invention.

Referring to FIGS. 3 and 5, the top frame body 110 includes a pair of lateral beams 111 which are in parallel with each other and aligned with each other, a pair of top corner fitting supporters 112 which are respectively located near both ends of the pair of lateral beams 111 and connected to both lateral beams 111, two top corner fittings 113 respectively fixed to the middle portions of both top corner fitting supporters 112, and connecting plates 114 respectively provided at the undersides of the end portions of the lateral beams 111 and formed with holes for connection.

In the present embodiment, each top corner fitting supporter 112 consists of two supporting beams. Both ends of each supporting beam are respectively welded to the two lateral beams 111. In addition, the two supporting beams of each top corner fitting supporter 112 are spaced from each other by a predetermined distance to mount a top corner fitting 113 thereon while ensuring the strength of the top corner fitting.

According to the present invention, the top corner fitting 113 may be formed by welding suitable plate members and other accessories together. In this embodiment, the top corner fitting 113 is formed by welding three plates each having a standard corner fitting hole, as shown in FIG. 3. Particularly, among the three plates, one plate bridges two supporting beams of the top corner fitting supporter 112, and the other two plates are respectively welded to suspend from two sides of the first plate other than the sides engaging with the supporting beams and meanwhile are connected to the two supporting beams of the top corner fitting supporter 112. Thus, a partially-opened structure is formed by the three plates together with the top corner fitting supporter 112, which is suitable for the stacking and lifting operation to the container during a transportation operation.

Figure 6:
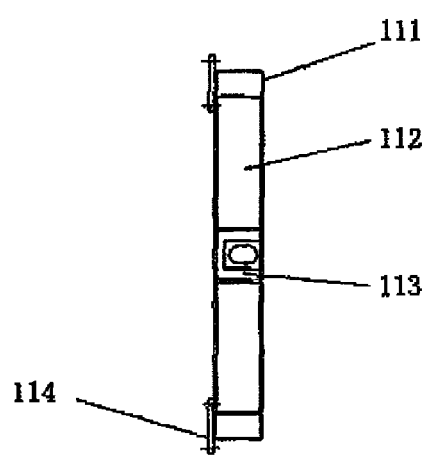
FIG. 6 is a side view of FIG. 5.

In addition, as shown in FIGS. 5 and 6, each top corner fitting 113 is formed at its upper wall with a top corner fitting hole 116 for cooperating with the lifting apparatus of the container. Theoretically, the upper surfaces of the two top corner fittings 113 are in the same horizontal plane, with being slightly higher (about 5-15 mm) than the uppermost surface of the top frame body 110, exclusive of the top corner fittings 113, or being as high as the aforementioned uppermost surface. The orientation of the top corner fitting holes 116 in the two top corner fittings 113 and the distance B between the two top corner fitting holes 116 satisfy the requirement for coupling with bottom corner fittings of a neighboring stacked container. That is, the length direction of the top corner fitting hole 116 is orientated along the length direction or the longitudinal direction of the container to be transported, and the distance B between the two top corner fitting holes 116 is 2260 mm for example. A certain manufacturing tolerance is allowed.

Again referring to FIG. 3, similarly, the bottom frame body 130 includes a pair of lateral beams 131 which are in parallel with each other and aligned with each other, a pair of bottom corner fitting supporters 132 which are respectively located near both ends of the pair of lateral beams 131 and connected to both lateral beams 131, two bottom corner fittings 133 respectively fixed to the middle portions of both bottom corner fitting supporters 132, and connecting plates 134 respectively provided at the upsides of the end portions of the lateral beams 131 and formed with holes for connection.

Similarly, each bottom corner fitting supporter 132 consists of two supporting beams. Both ends of each supporting beam are respectively welded to the two lateral beams 131. In addition, the two supporting beams of each bottom corner fitting supporter 132 are spaced from each other by a predetermined distance to mount a bottom corner fitting 133 thereon while ensuring the strength of the bottom corner fitting.

Also similarly, the bottom corner fitting 133 may be formed by welding suitable plate members and other accessories together. In this embodiment, the bottom corner fitting 133 is formed by welding three plates each having a standard corner fitting hole. Particularly, among the three plates, one plate bridges two supporting beams of the bottom corner fitting supporter 132, and the other two plates are respectively welded to suspend from two sides of the one plate other than the sides engaging with the supporting beams and meanwhile are connected to the two supporting beams of the bottom corner fitting supporter 132. Thus, a partially-opened structure is formed by the three plates together with the bottom corner fitting supporter 132, which is suitable for the stacking operation of the container during a transportation operation.

Also similar to the top corner fitting 113, each bottom corner fitting 133 is formed at its lower wall with a bottom corner fitting hole. Theoretically, the bottom surfaces of the two bottom corner fittings 133 are in the same horizontal plane, with being slightly lower (about 5-15 mm) than the lowermost surface of the bottom frame body 130, exclusive of the bottom corner fittings 133, or being as low as the aforementioned lowermost surface. The orientations of the bottom corner fitting holes in the two bottom corner fitting 133 and the distance between the two bottom corner fitting holes satisfy the requirement for coupling with top corner fittings of a neighboring stacked container. That is, the length direction of the bottom corner fitting hole is orientated along the length direction or the longitudinal direction of the container to be transported, and the distance between the two bottom corner fitting holes is 2260 mm for example. A certain manufacturing tolerance is allowed.

It should be understood that the top corner fittings 113 and the bottom corner fittings 133 may be fixed to other suitable positions on the top corner fitting supporter 112 and the bottom corner fitting supporter 132 according to the specific requirements.

Preferably, the top frame body 110 and the bottom frame body 130 have completely identical structures and thus are exchangeable.

In addition, the above-mentioned top and bottom corner fittings may be integrally formed. Also, these corner fittings may be standard corner fittings or non-standard corner fittings.

Figure 4:
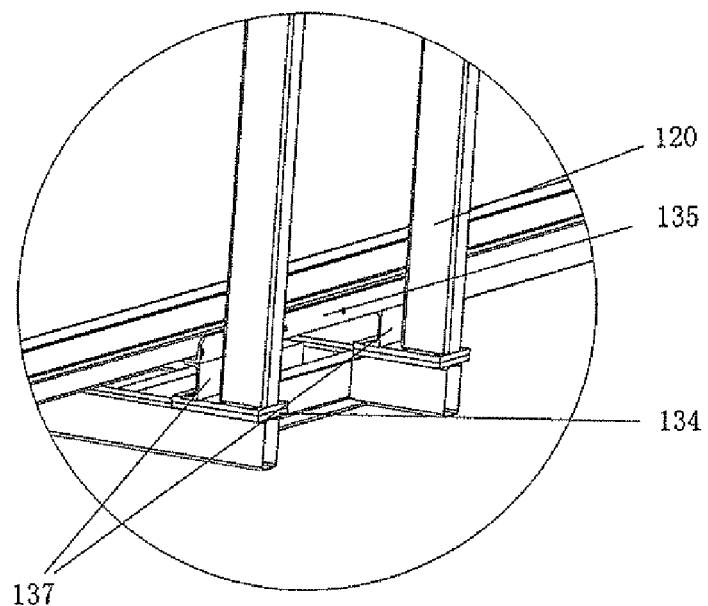
FIG. 4 is an enlarged view of part I in FIG. 1.

As shown in FIGS. 3 and 4, each vertical post 120 is provided at its upper and lower ends with a connecting plate 117 respectively for connecting with the connecting plate 114 of the top frame body 110 and the connecting plate 134 of the bottom frame body 130. The connecting plate 117 of the vertical post 120 is also formed with holes corresponding to the holes in the connecting plate 114 of the top frame body 110 or the holes in the connecting plate 134 of the bottom frame body 130. Thus, by means of the holes in the connecting plates as well as bolts and nuts, the top frame body 110, the vertical posts 120 and the bottom frame body 130 may be connected with each other to form an integrated structure. It should be understood that the corresponding connecting plates can also be fastened together by other suitable fastening members such as locating pins, cotter pins, screws, rivets and the like. In addition, although the pairs of connecting plates are illustrated to be horizontally orientated, they apparently may be vertically orientated. Furthermore, according to the particular application environment, the vertical posts 120, the top frame body 110 and the bottom frame body 130 may be fixedly connected with each other together by means of other suitable ways.

When the posts 120, the top frame body 110 and the bottom frame body 130 are connected with each other, the orthographic projections of the two top corner fitting holes 116 onto a horizontal plane theoretically coincide with those of the two bottom corner fitting holes onto the horizontal plane. A certain manufacturing tolerance is allowed as long as the distance between the top corner fitting holes 116 and the distance between the bottom corner fitting holes satisfy the requirement for coupling with the top and bottom corner fittings of neighboring stacked containers, when two transportation frames are mounted onto a container to be transported.

Figure 10:
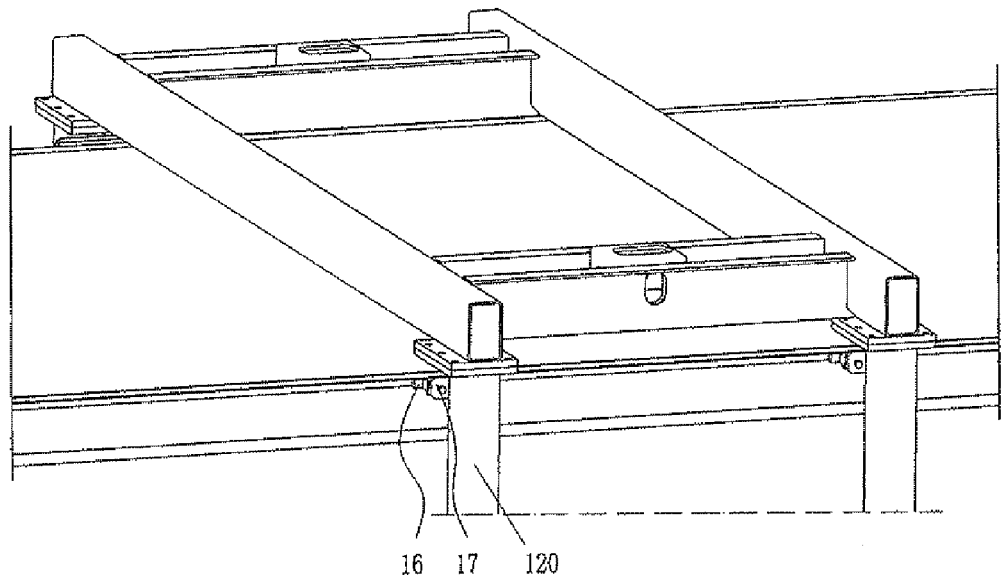
FIG. 10 is a perspective view partially showing the connection between the upper portion of the transportation frame for the oversize container according to the present invention and the container to be transported, especially showing the connection between the tightening mechanism of the transportation frame for the oversize container and the container to be transported.
Figure 11:
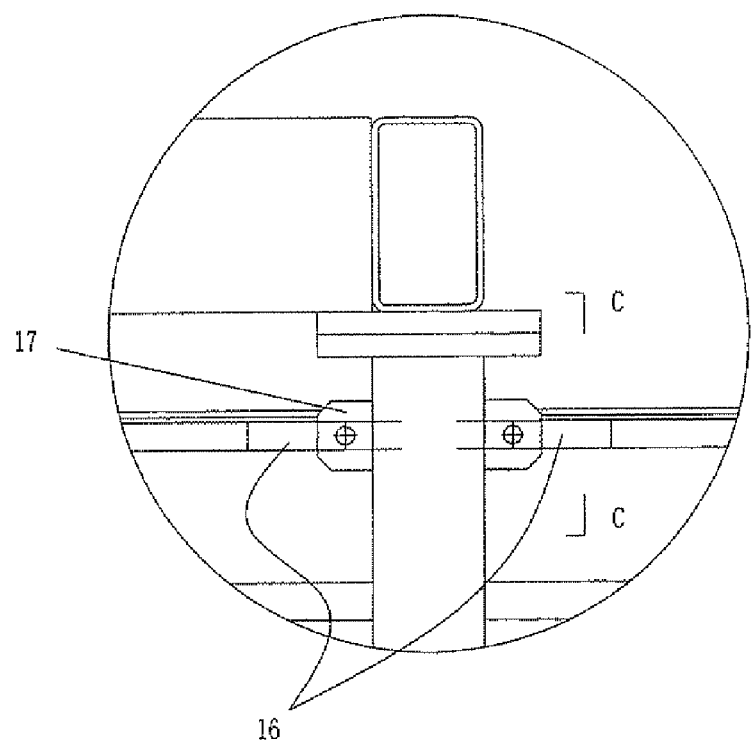
FIG. 11 is a perspective view partially showing the connection between the upper portion of the transportation frame for the oversize container according to the present invention and the container to be transported, especially showing the connection between the tightening mechanism of the transportation frame for the oversize container and the container to be transported.
Figure 12:
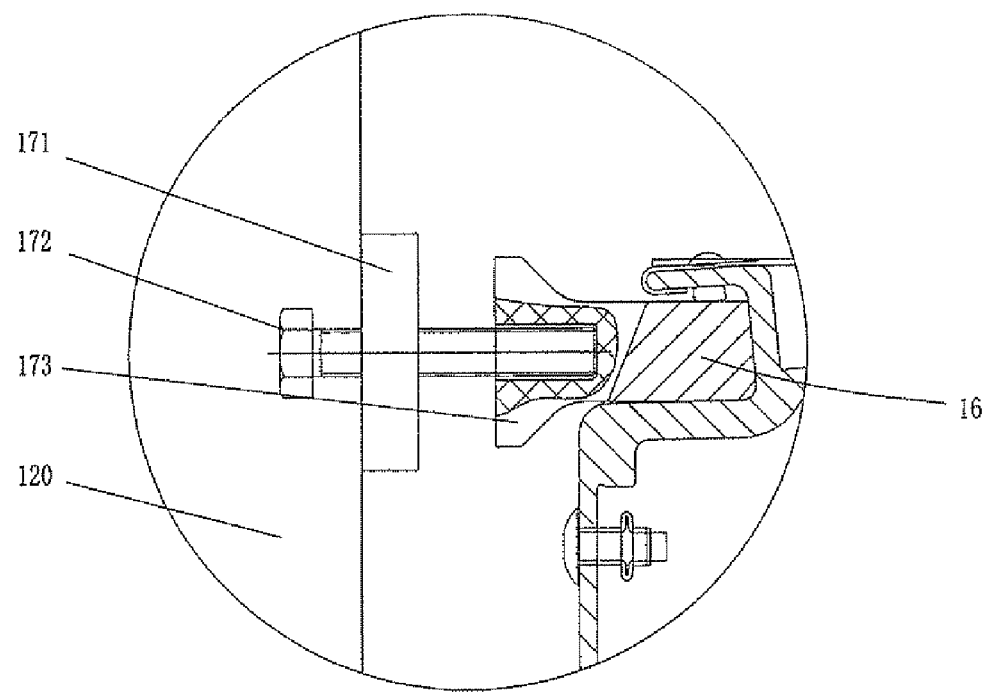
FIG. 12 is a sectional view taken along line C-C of FIG. 11.

As shown in FIGS. 10 to 12, the transportation frame is provided with a tightening mechanism 17 at an upper inner side of at least one vertical post 120, which is used to prevent the upper portion of the container 2 from being laterally displaced when being transported. The tightening mechanism 17 includes a plate member 171 fixed to the upper inner side of the post 120 and formed with a threaded through hole, a tightening bolt 172 capable of engaging with the threaded through hole of the plate member 171, and an pressing block 173 arranged at the front end of the tightening bolt 172. The front end of the pressing block 173 is directly contacted with the container, and the rear end of the pressing block 173 is formed with a blind hole in which the front end of the tightening bolt 172 is inserted with a radial clearance therebetween so that the pressing block 173 will not rotate together with the tightening bolt 172 when the tightening bolt 172 is being screwed. The pressing block 173 is made of nylon so as to prevent a damage to the container to be transported.

In addition, in order to prevent a displacement of the transportation frame with respect to the container 2 to be transported in the longitudinal direction of the container 2, the tightening mechanism 17 is further cooperated with two stopping blocks 16 which are fixedly connected to the container and clamp the pressing block 173 therebetween.

Referring to FIGS. 1, 3 and 4, two container-connecting members 135 for connecting with the container 2 are arranged respectively at both inner sides of the lower portion of the transportation frame 1. The container-connecting member 135 may be fixed to the bottom frame body 130 or the posts 120.

In the present embodiment, for example, the container-connecting member 135 is an elongated piece with an "L"-shaped profile. In the wall of the container-connecting member 135 to be connected with the container 2, a plurality of holes are formed so as to allow connection of the container-connecting member 135 to the container by means of screws for example. The container-connecting member 135 may be arranged to contact with only the bottom surface of the container with the horizontal portion of the "L"-shaped profile, or simultaneously contact with the bottom surface and the lower side surface of the container with the horizontal and vertical portions of the "L"-shaped profile. By means of the container-connecting member 135, a relative movement of the transportation frame 1 especially the lower portion thereof with respect to the container 2 may be further prevented, and meanwhile the transportation frame 1 especially the bottom frame body 130 may be strengthened.

As shown in FIG. 4, the container-connecting member 135 may be indirectly fixed to the lateral beams 131 of the bottom frame body 130 through two supporting seats 137 having "["-shaped cross sections so that a predetermined gap is vertically formed between the horizontal supporting surface of the container-connecting member 135 and the upper surface of the bottom frame body 130. The contain-connecting member 135 may be fixed to the supporting seats 137 by means of welding or other suitable ways such as riveting or screwing. The supporting seats 137 may be fixed to the lateral beams 131 of the bottom frame body 130 by means of detachable ways such as riveting or screwing.

In addition, the distance between the vertical walls of the two opposite "L"-shaped container-connecting members 135 is slightly larger than or essential equal to the width of the container 2 so that the container 2 may be supported by the horizontal walls of the two "L"-shaped container-connecting members 135 and spaced from the lateral beams 131 of the bottom frame body 130 by the aforementioned predetermined gap. Moreover, the height of each post 120 shall ensure a certain distance between the upper portion of the container 2 and the top frame body 110 after the transportation frame 1 is installed onto the container 2, which may provide a buffer space between the container 2 and the top frame body 110.

In the present invention, besides the function of enhancing the bottom frame body 130, the container-connecting member 135 has an additional function that it may be adapted for the dimensions of a relatively small container 2 to be transported by means of adjusting the installation positions thereof, in case that a transportation frame 1 essentially dimensioned for a relatively large container is used for the relatively small container 2.

In order to improve the strength and rigidity of the transportation frame 1 against external impacts during the transportation, the transportation frame 1 is further equipped with a reinforcing mechanism. The reinforcing mechanism has a side connected to the lateral beam 131 of the bottom frame body 130 and another side connected to the bottom structure of the container 2 to be transported, so that a portion of the external impact received by the transportation frame 1 may be transferred to the container 2 to be transported, thereby improving the strength and rigidity of the transportation frame 1.

Figure 7:
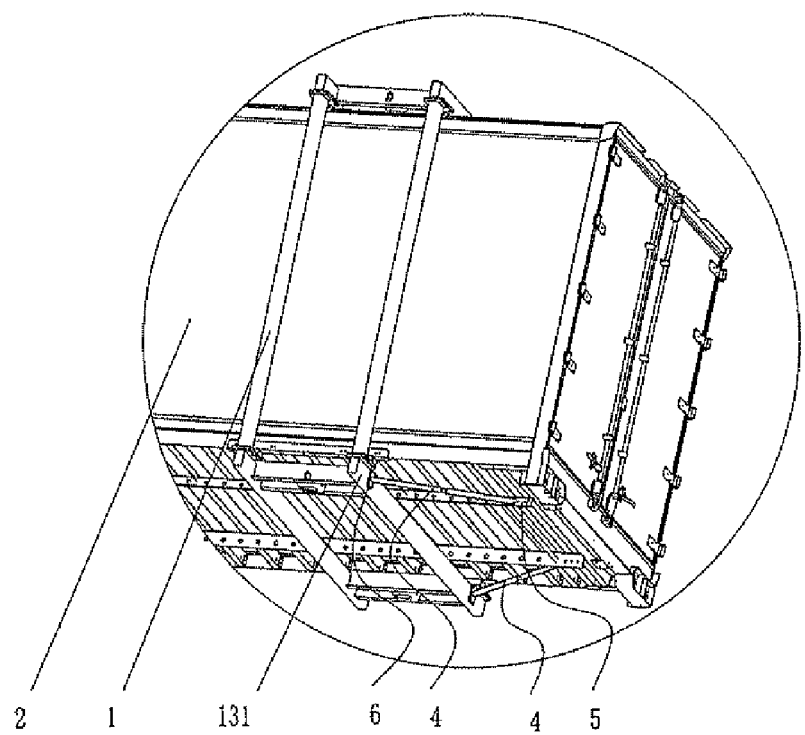
FIG. 7 is a perspective view showing a reinforcing mechanism of the transportation frame for the oversize container according to an embodiment of the present invention, which is connected to the bottom structure of the container to be transported.

An embodiment of the reinforcing mechanism is illustrated in FIG. 7. As shown in FIG. 7, the reinforcing mechanism includes a bar 4, a first connecting plate 5 and a second connecting plate 6 where both ends of the bar 4 are respectively connected to the first connecting plate 5 and the second connecting plate 6. The first connecting plate 5 and the second connecting plate 6 are further respectively connected to the bottom structure of the container to be transported and the lateral beam 131 of the bottom frame body 130, by means of welding for example. Alternatively, the first connecting plate 5 and the second connecting plate 6 may be formed with a plurality of holes, and then may be connected to the bottom structure of the container 2 and the lateral beam 131 of the bottom frame body 130 by threaded fasteners such as bolts or screws.

In case of using bolts or screws to connect the reinforcing mechanism with the container 2 and the transportation frame 1, the bar 4 is preferably designed as a length adjustable structure so as to ensure an effective reinforcement effect of the reinforcing mechanism. The bar may be designed as a three-piece member formed of two sleeves which are connected to the first connecting plate 5 and the second connecting plate 6 respectively and formed with internal threads, and a threaded rod with external threads formed at its two end portions respectively, by which the threaded rod is connected to the two sleeves with internal threads. The external threads at the two end portions of the threaded rod are contrary in their styles. That is, if the external thread at one end portion of the threaded rod is a right-hand one, the external thread at another end portion of the threaded rod must be a left-hand one, or vice versa. Thus, when rotating the threaded rod, both ends of the threaded rod will simultaneously enter into or retracts from the two sleeves so that the length of the bar 4 may be suitably adjusted and a suitable reinforcing effect of the reinforcing mechanism may be achieved.

Figure 8:
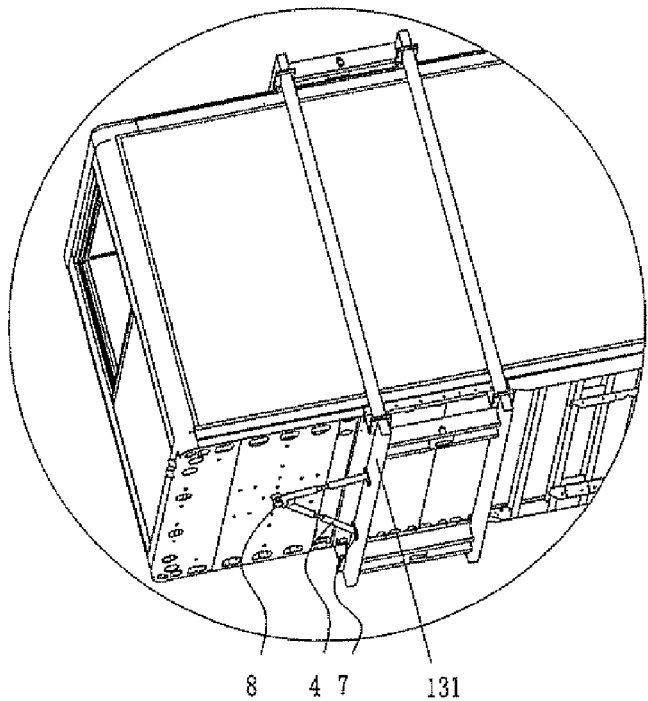
FIG. 8 is a perspective view partially showing a reinforcing mechanism of the transportation frame for the oversize container according to another embodiment of the present invention, which is connected to the bottom structure of the container to be transported.
Figure 9:
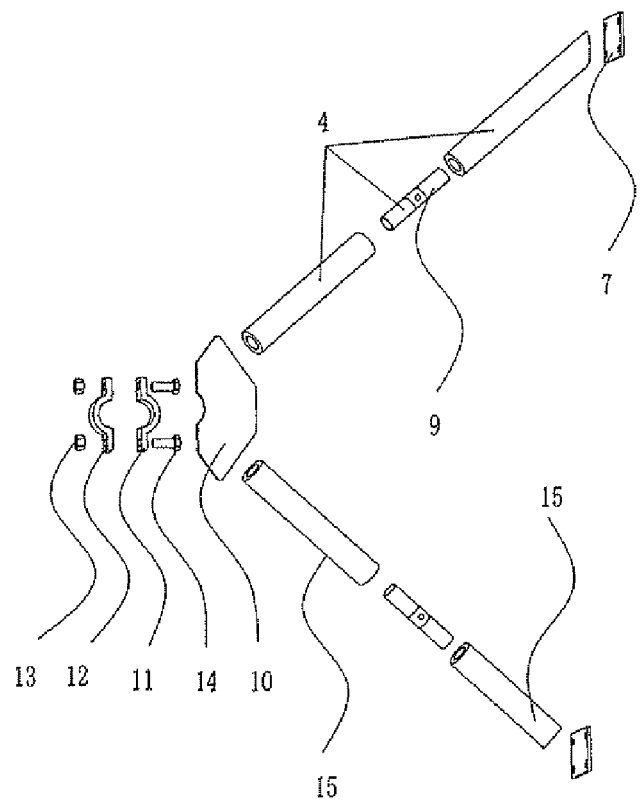
FIG. 9 is an exploded view of the reinforcing mechanism shown in FIG. 8.

FIGS. 8 and 9 illustrate another embodiment of the reinforcing mechanism. As shown in FIGS. 8 and 9, the reinforcing mechanism includes a front connecting plate 10, two bars 4 each having a first end connected to the front connecting plate 10, two rear connecting plates 7 respectively connected to the second ends of the two bars 4 and also both connected to the lateral beam 131 of the bottom frame body 130 with a certain distance spaced from each other, a first generally semi-ring shaped member 11 fixed to the front connecting plate 10, a second generally semi-ring shaped member 12 cooperating with the first generally semi-ring shaped member 11, and bolts 14 and nuts 13 for connecting the first and second generally semi-ring shaped members together. The inner surfaces of the first generally semi-ring shaped member 11 and the second generally semi-ring shaped member 12 are adapted to clamp a pin member projecting from the bottom of the container to be transported (e.g. pin 8 at the bottom of the container as shown in FIG. 8). The two rear connecting plates 7 are connected to the lateral beam 131 of the bottom frame body 130 by means of suitable manners such as screws. Similarly, each of the two bars 4 may be designed as a three-piece member formed of two sleeves 15 connected to the front connecting plate 10 and the rear connecting plates 7 respectively, and a threaded rod 9 connected to the two sleeves 15 with the external threads formed at its two end portions respectively, where the external threads at the two end portions of the threaded rod 9 are contrary in their styles and the internal threads of the two sleeves are contrary too.

In another embodiment, the top frame body 110 of the transportation frame 1 may be implemented as other style structures such as an "H"-shaped structure composed of a single lateral beam 111 and two top corner fitting supporters 112 as described above. Particularly, in the "H"-shaped structure, the two top corner fitting supporters 112 are arranged to be spaced from each other and also parallel with each other, as in the afore-mentioned embodiment, and both ends of the single lateral beam 111 are respectively connected to the middle portions of the two top corner fitting supporters 112. Similarly, the bottom frame body 130 of the transportation frame 1 may also be implemented as the above mentioned "H"-shaped structure or other suitable structures.

In another embodiment, the two posts 120 of the transportation frame 1 located at the same side of the container may be interconnected by means of rods to farther enhance the whole rigidity of the frame.

The detachable connection of the posts 120, the top frame body 110 and the bottom frame body 130 on one hand facilitates installation of the frame onto the container (which will be described hereinafter) and on the other hand is advantageous in that after use the assembled frame may be disassembled for storage, thereby reducing the space occupied by the frame.

Now a method of installing the transportation frame according to the present invention onto the container is to be described hereinafter.

Referring to FIGS. 1, 2 and 4, the method generally includes the following steps:

Firstly, install two transportation frames 1 according to the present invention onto the front end and the rear end of the container 2 to be transported, and ensure the distance between the two top corner fitting holes of the two frames 1 in the longitudinal direction of the container and the distance A between the two bottom corner fitting holes of the two frames 1 in the longitudinal direction of the container respectively to satisfy the requirements for connecting with the bottom corner fittings and the top corner fittings of neighboring stacked containers. For example, in case of connecting with a 40 feet standard container, the aforementioned distance is theoretically 11989 mm and a certain tolerance is allowed as long as the actual distance may ensure a reliable coupling of the container 2 to the 40 feet standard container.

Next, connect the container-connecting member 135 with the container 2 to be transported together, and operating the tightening mechanism 17 to press against the container 2 to be transported.

Especially, in the case that the posts 120, the top frame body 110 and the bottom frame body 130 are detachably connected with each other, the above-mentioned method includes the following steps:

Step 1: fix the container-connecting members 135 to the lateral beam 131 of the bottom frame body 130 through the supporting seats 137 so as to ensure that a distance between the vertical portions of the two opposite container-connecting members 135 is slightly wider or essentially equal to the width of the container 2 to be transported. In practice, the top frame body 110 may be also equipped with container-connecting members 135 as required;

Step 2: dispose two bottom frame bodies 130 in the same level and ensure that the distance A between the two bottom corner fitting holes of the two bottom frame bodies 130 in the longitudinal direction of the container 2 satisfies the requirements for connecting with top corner fittings of a neighboring stacked container (as mentioned above);

Step 3: place the container 2 to be transported onto the horizontal portions of the container-connecting members 135 on the bottom frame bodes 130;

Step 4: connect the container-connecting members 135 with the bottom structure of the container 2 to be transported together by riveting or screwing;

Step 5: connect the posts 120 to the bottom frame body 130 by use of the corresponding connecting plates 117 and 134;

Step 6: connect the top frame body 110 to the posts 120 by use of the corresponding connecting plates 117 and 114 and ensure that the distance between the top corner fitting holes of the two top frame bodies 110 in the longitudinal direction of the container 2 satisfies the requirements for connecting with the bottom corner fittings of a neighboring stacked container;

Step 7: operate the tightening mechanism 17 to press against the container 2.

The disassembled operation of the transportation frame 1 only needs to perform a series of contrary steps.

Here, Step 2 may be performed immediately after Steps 2 or 3. Step 4 may be performed immediately after Steps 5, 6 or 7. Step 7 may be performed immediately prior to Step 6. In practice, if it is necessary to equip both of the top and bottom frame bodies with the container-connecting members 135, Step 1 may be performed immediately after Steps 4 and 5. Also, the container-connecting members 135 may be separately fixed to the top and bottom frame bodies.

When there is a reinforcing mechanism provided, the method further includes a step of connecting the reinforcing mechanism to the bottom structure of the container.

Conclusively, the transportation frame according to the present invention has an advantage of easily installing and dismantling, as well as easily recycling. The installation and separation of the transportation frames and containers are also easy to operate. By use of the transportation frame according to the present invention, both hoisting and stacking special containers are available, which contributes to the convenient transportation.

What is claimed is:

1. A transportation frame for an oversize container, including:
    a top frame body comprising two top corner fittings positioned at its both sides respectively, each of the top corner fittings having a top corner fitting hole for cooperating with a container-crane or a twist lock of a neighboring stacked container, upper surfaces of the two top corner fittings being in an identical horizontal plane and slightly higher than or being as high as an uppermost surface of the top frame body, exclusive of the top corner fittings;
    a bottom frame body comprising two bottom corner fittings positioned at its both sides respectively, each of the bottom corner fittings having a bottom corner fitting hole for cooperating with a twist lock of a neighboring stacked container, low surfaces of the two bottom corner fittings being in an identical horizontal plane and slightly lower than or being as low as a lowermost surface of the bottom frame body, exclusive of the bottom corner fittings; and
    a plurality of posts each having two ends respectively connected to the top frame body and the bottom frame body,
    wherein orientations of two top corner fitting holes in the two top corner fittings and a distance between the two top corner fitting holes, as well as orientations of two bottom corner fitting holes in the two bottom corner fittings and a distance between the two bottom corner fitting holes satisfy requirements for coupling with corner fittings of neighboring stacked containers, and orthographic projections of the two top corner fitting holes onto a horizontal plane coincide with those of the two bottom corner fitting holes onto the horizontal plane.

2. The transportation frame for an oversize container as set forth in claim 1, further including a tightening mechanism provided at an upper inner side of at least one of the posts, for preventing an upper portion of the container from being laterally displaced.

3. The transportation frame for an oversize container as set forth in claim 2, wherein the tightening mechanism includes:
    a plate member fixed to the upper inner side of the post and formed with a threaded through hole,
    a tightening bolt capable of engaging with the threaded through hole of the plate member, and
    a pressing block arranged at a front end of the tightening bolt, wherein a front end of the pressing block is contacted with the container, and a rear end of the pressing block is formed with a blind hole in which the front end of the tightening bolt is inserted with a radial clearance.

4. The transportation frame for an oversize container as set forth in claim 3, wherein
    the tightening mechanism is further cooperated with two stopping blocks which are fixedly connected to the container and clamp the pressing block therebetween for preventing a displacement of the transportation frame with respect to the container to be transported in the longitudinal direction of the container.

5. The transportation frame for an oversize container as set forth in claim 1, further including a container-connecting member at the bottom frame body or the posts for connecting with the container.

6. The transportation frame for an oversize container as set forth in claim 5, wherein the container-connecting member is an elongated piece with an "L"-shaped profile, and includes a wall to be connected with the oversize container in which a plurality of holes are formed so as to allow connection of the container-connecting member to the container by fasteners inserted through the corresponding holes.

7. The transportation frame for an oversize container as set forth in claim 1, wherein the posts are fixedly connected with the top frame body and the bottom frame body.

8. The transportation frame for an oversize container as set forth in claim 1, wherein the posts are detachably connected with the top frame body and the bottom frame body.

9. The transportation frame for an oversize container as set forth in claim 8, wherein
    the top frame body includes: a pair of lateral beams which are in parallel with each other and aligned with each other, a pair of top corner fitting supporters respectively located near both ends of the pair of lateral beams and connected to them, two top corner fittings respectively fixed to middle portions of the top corner fitting supporters, and connecting plates respectively provided at undersides of end portions of the lateral beams of the top frame body and formed with holes for connection;
    the bottom frame body includes: a pair of lateral beams which are in parallel with each other and aligned with each other, a pair of bottom corner fitting supporters respectively located near both ends of the pair of lateral beams and connected to them, two bottom corner fittings respectively fixed to middle portions of the bottom corner fitting supporters, and connecting plates respectively provided at upsides of end portions of the lateral beams of the bottom frame body and formed with holes for connection;

the plurality of posts includes four posts, and each post is provided at its upper and lower ends with a connecting plate respectively for connecting with the connecting plate of the top frame body and the connecting plate of the bottom frame body, and each connecting plate of the post is formed with holes corresponding to the holes in the connecting plate of the top frame body or in the connecting plate of the bottom frame body; and the top frame body, the posts and the bottom frame body are fastened together by use of fasteners inserted through the holes in the corresponding connecting plates to thus form an integrated structure.

10. The transportation frame for an oversize container as set forth in claim 1, further including a reinforcing mechanism with a side connected to the lateral beam of the bottom frame body and another side connected to the container to be transported.

11. The transportation frame for an oversize container as set forth in claim 10, wherein the reinforcing mechanism includes: a bar, a first connecting plate and a second connecting plate, and wherein both ends of the bar are respectively connected to the first connecting plate and the second connecting plate, and the first and second connecting plates are further respectively connected to the container to be transported and the lateral beam of the bottom frame body.

12. The transportation frame for an oversize container as set forth in claim 11, wherein in case that the first connecting plate and the second connecting plate are connected with the container and the transportation frame by threaded fasteners, the bar is designed as a length adjustable structure comprising:

two sleeves connected to the first connecting plate and the second connecting plate respectively and formed with internal threads of contrary styles, and a threaded rod which is connected to the two sleeves and has external threads formed at its two end portions respectively, the external threads at the two end portions of the threaded rod being contrary in their styles so that both ends of the threaded rod simultaneously enters into or retracts from the two sleeves when rotating the threaded rod.

13. The transportation frame for an oversize container as set forth in claim 10, wherein the reinforcing mechanism includes:

a front connecting plate;

two bars each having a first end connected to the front connecting plate;

two rear connecting plates respectively connected to second ends of the two bars and also both connected to the lateral beam of the bottom frame body with a predetermined distance spaced from each other;

a first generally semi-ring shaped member fixed to the front connecting plate;

a second generally semi-ring shaped member to be cooperated with the first generally semi-ring shaped member; and fasteners for connecting the first and second generally semi-ring shaped members together, wherein inner surfaces of the first generally semi-ring shaped member and the second generally semi-ring shaped member are adapted to clamp a pin member projecting from a bottom of the container to be transported, the two rear connecting plates are formed with holes for connecting with the lateral beam of the bottom frame body, and each of the two bars includes: two sleeves connected to the front and rear connecting plates respectively and both formed with internal threads of contrary styles, and a threaded rod connected to the two sleeves with corresponding external threads formed at its two end portions respectively.

* * * * *